United States Patent [19]
Pelech et al.

[11] Patent Number: 5,970,848
[45] Date of Patent: Oct. 26, 1999

[54] DUAL RESERVOIR COFFEE MACHINE

[76] Inventors: Geraldine T. Pelech, P.O. Box 82, Vilna, Alberta, Canada, T0A3l0; Donna Mae Ellerbeck, 11812-158 Avenue, Edmonton, Alberta, Canada, T5X2K4

[21] Appl. No.: 09/096,417

[22] Filed: Jun. 11, 1998

[51] Int. Cl.⁶ .................................................. A47J 31/00
[52] U.S. Cl. .................................. 99/291; 99/306; 99/307
[58] Field of Search ............................... 99/291, 304, 305, 99/306, 307, 284, 295; 219/291, 446, 482; 392/444

[56] References Cited

U.S. PATENT DOCUMENTS

| | | | |
|---|---|---|---|
| 4,651,900 | 3/1987 | Horvath et al. | 222/144.5 |
| 4,802,406 | 2/1989 | Bouldin | 99/295 |
| 5,335,589 | 8/1994 | Yerves, Jr. et al. | 99/295 |
| 5,855,163 | 1/1999 | DeMars | 99/291 |

*Primary Examiner*—Reginald L. Alexander

[57] ABSTRACT

A new dual reservoir coffee machine for making two different types of coffee in two separate pots. The inventive device includes a dual system coffee maker comprised of a housing. The housing has an upper water dispensing portion and a lower burner portion. A control panel is disposed within the housing of the dual system coffee maker. A coffee filter attachment couples with the water dispensing portion of the dual system coffee maker. A pair of semi-cylindrical pots are positionable on the lower burner portion of the dual system coffee maker. Each of the pots have a cover with an opening therethrough. The openings align with the coffee filter attachment. Each of the pots have a handle extending outwardly therefrom.

4 Claims, 2 Drawing Sheets

DUAL RESERVOIR COFFEE MACHINE

BACKGROUND OF THE INVENTION

1. Field of the Invention

The present invention relates to coffee makers and more particularly pertains to a new dual reservoir coffee machine for making two different types of coffee in two separate pots.

2. Description of the Prior Art

The use of coffee makers is known in the prior art. More specifically, coffee makers heretofore devised and utilized are known to consist basically of familiar, expected and obvious structural configurations, notwithstanding the myriad of designs encompassed by the crowded prior art which have been developed for the fulfillment of countless objectives and requirements.

Known prior art coffee makers include U.S. Pat. No. 5,335,589 to Yerves, Jr. et al.; U.S. Pat. No. 4,207,809 to Brill; U.S. Pat. No. 4,651,862 to Greenfield, Jr.; U.S. Pat. No. 4,550,652 to Da Silva; U.S. Pat. No. 4,039,772 to Thorsoe et al.; and U.S. Pat. No. Des. 334,685 to Coulter.

While these devices fulfill their respective, particular objectives and requirements, the aforementioned patents do not disclose a new dual reservoir coffee machine. The inventive device includes a dual system coffee maker comprised of a housing. The housing has an upper water dispensing portion and a lower burner portion. A control panel is disposed within the housing of the dual system coffee maker. A coffee filter attachment couples with the water dispensing portion of the dual system coffee maker. A pair of semi-cylindrical pots are positionable on the lower burner portion of the dual system coffee maker. Each of the pots have a cover with an opening therethrough. The openings align with the coffee filter attachment. Each of the pots have a handle extending outwardly therefrom.

In these respects, the dual reservoir coffee machine according to the present invention substantially departs from the conventional concepts and designs of the prior art, and in so doing provides an apparatus primarily developed for the purpose of making two different types of coffee in two separate pots.

SUMMARY OF THE INVENTION

In view of the foregoing disadvantages inherent in the known types of coffee makers now present in the prior art, the present invention provides a new dual reservoir coffee machine construction wherein the same can be utilized for making two different types of coffee in two separate pots.

The general purpose of the present invention, which will be described subsequently in greater detail, is to provide a new dual reservoir coffee machine apparatus and method which has many of the advantages of the coffee makers mentioned heretofore and many novel features that result in a new dual reservoir coffee machine which is not anticipated, rendered obvious, suggested, or even implied by any of the prior art coffee makers, either alone or in any combination thereof.

To attain this, the present invention generally comprises a dual system coffee maker comprised of a housing. The housing has an upper water dispensing portion and a lower burner portion. The housing includes a water holding reservoir therein. An opening in an upper end of the housing exposes the reservoir. The reservoir has a pair of tubes extending outwardly therefrom and extending upwardly into the water dispensing portion. The tubes have open upper ends. The reservoir has a selector valve and a heater in communication with the pair of tubes. A control panel is disposed within the housing of the dual system coffee maker. The control panel is in communication with the selector valve and the heater of the dual system coffee maker. The control panel includes a clock, a variable power switch and a timer. A coffee filter attachment couples with the water dispensing portion of the dual system coffee maker. The coffee filter attachment has a central divider panel separating the attachment into two sections. Each of the sections is disposed below the open upper ends of the pair of tubes. Each of the sections have an opening in a lower end thereof. The lower ends of the sections each have a spring extending downwardly therefrom. A pair of semi-cylindrical pots are positionable on the lower burner portion of the dual system coffee maker. Each of the pots have a cover with an opening therethrough. The openings align with the openings in the lower end of the coffee filter attachment. Each of the pots have a handle extending outwardly therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dual reservoir coffee machine apparatus and method which has many of the advantages of the coffee makers mentioned heretofore and many novel features that result in a new dual reservoir coffee machine which is not anticipated, rendered obvious, suggested, or even implied by any of the prior art coffee makers, either alone or in any combination thereof.

It is another object of the present invention to provide a new dual reservoir coffee machine which may be easily and efficiently manufactured and marketed.

It is a further object of the present invention to provide a new dual reservoir coffee machine which is of a durable and reliable construction.

An even further object of the present invention is to provide a new dual reservoir coffee machine which is susceptible of a low cost of manufacture with regard to both materials and labor, and which accordingly is then susceptible of low prices of sale to the consuming public, thereby making such dual reservoir coffee machine economically available to the buying public.

Still yet another object of the present invention is to provide a new dual reservoir coffee machine which provides in the apparatuses and methods of the prior art some of the advantages thereof, while simultaneously overcoming some of the disadvantages normally associated therewith.

Still another object of the present invention is to provide a new dual reservoir coffee machine for making two different types of coffee in two separate pots.

Yet another object of the present invention is to provide a new dual reservoir coffee machine which includes a dual system coffee maker comprised of a housing. The housing has an upper water dispensing portion and a lower burner portion. A control panel is disposed within the housing of the dual system coffee maker. A coffee filter attachment couples with the water dispensing portion of the dual system coffee maker. A pair of semi-cylindrical pots are positionable on the lower burner portion of the dual system coffee maker. Each of the pots have a cover with an opening therethrough. The openings align with the coffee filter attachment. Each of the pots have a handle extending outwardly therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
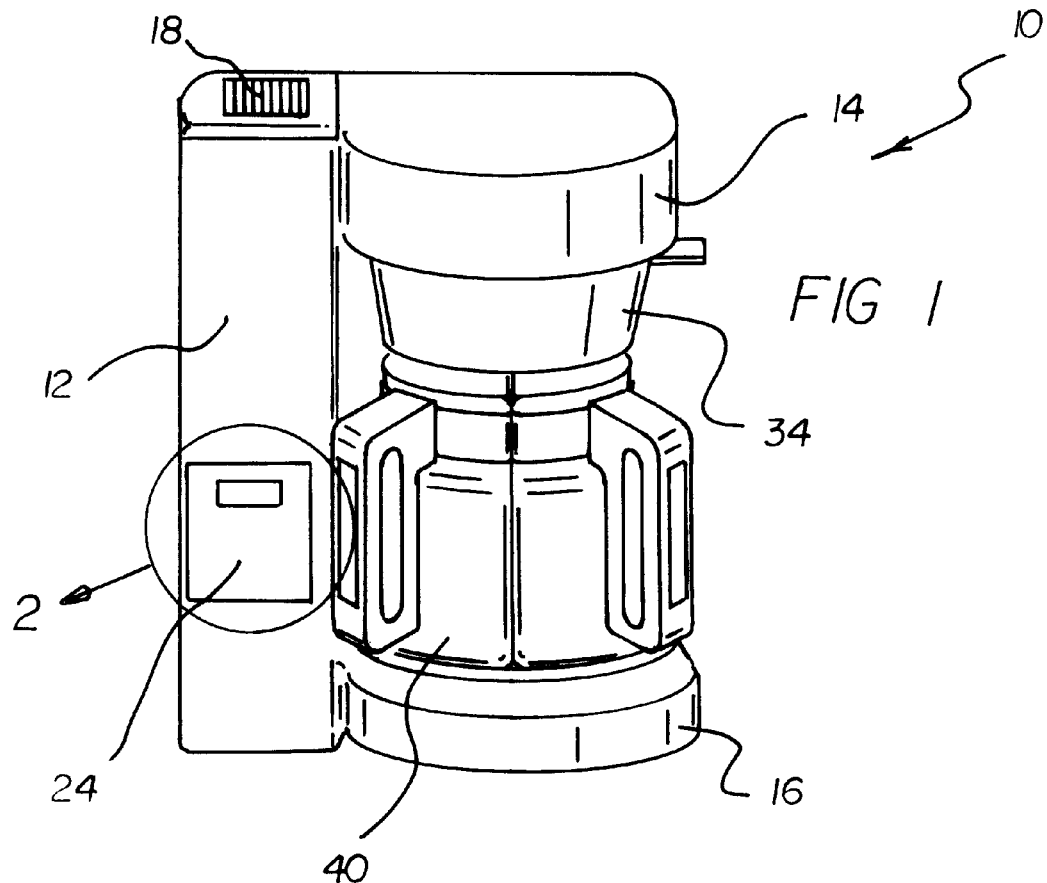
FIG. 1 is a front view of a new dual reservoir coffee machine according to the present invention.
Figure 2:
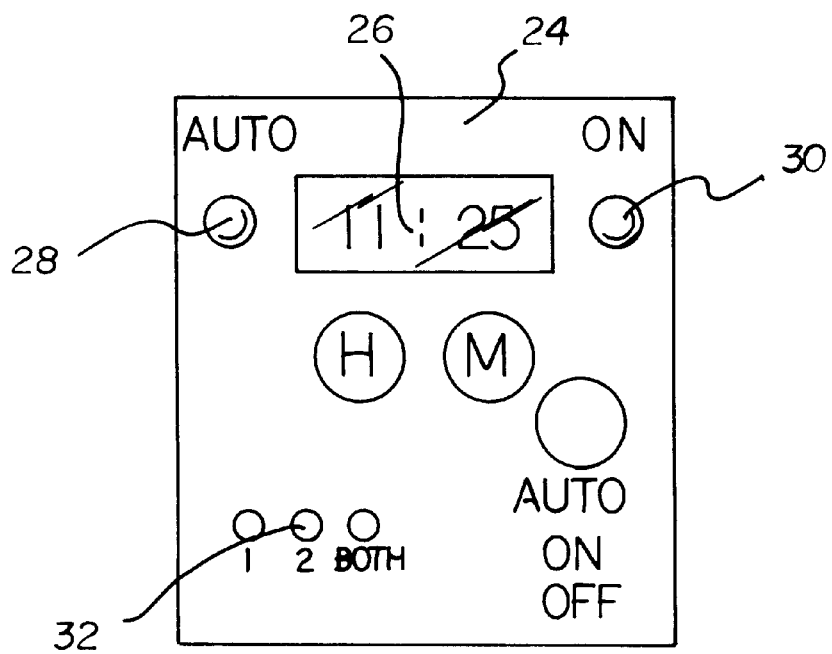
FIG. 2 is a front view of the control panel of the present invention.
Figure 3:
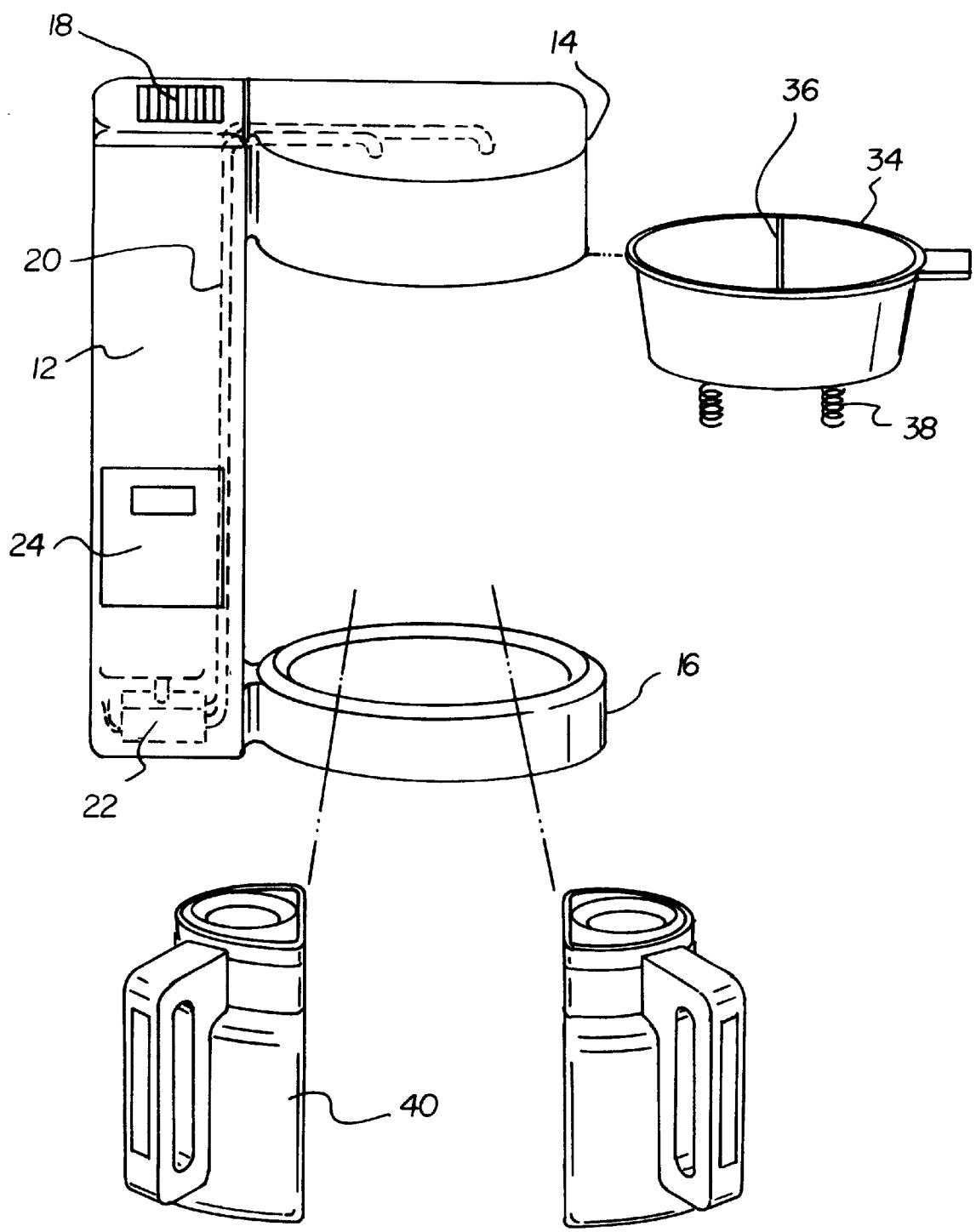
FIG. 3 is an exploded front view of the present invention.

With reference now to the drawings, and in particular to FIGS. 1 through 3 thereof, a new dual reservoir coffee machine embodying the principles and concepts of the present invention and generally designated by the reference numeral 10 will be described.

As best illustrated in FIGS. 1 through 3, the dual reservoir coffee machine 10 comprises a dual system coffee maker comprised of a housing 12. The housing 12 has an upper water dispensing portion 14 and a lower burner portion 16. The housing 12 includes a water holding reservoir therein. An opening 18 in an upper end of the housing exposes the reservoir. The reservoir has a pair of tubes 20 extending outwardly therefrom and extending upwardly into the water dispensing portion 14. The tubes 20 have open upper ends. The reservoir has a selector valve 22 and a heater in communication with the pair of tubes 20.

A control panel 24 is disposed within the housing 12 of the dual system coffee maker. The control panel 24 is in communication with the selector valve 22 and the heater of the dual system coffee maker. The control panel 24 includes a clock 26, a variable power switch and a timer. The control panel 24 includes an indicator light 28 that denotes automatically on, another light 30 that indicates manually on, another light 32 that indicates which pot or if both pots are being used. The control panel 24 will control the selector valve 22 as to the disbursement of the water from the water reservoir.

A coffee filter attachment 34 couples with the water dispensing portion 14 of the dual system coffee maker. The coffee filter attachment 34 has a central divider panel 36 separating the attachment 34 into two sections. Each of the sections is disposed below the open upper ends of the pair of tubes 20. Each of the sections have an opening in a lower end thereof. The lower ends of the sections each have a spring 38 extending downwardly therefrom.

A pair of semi-cylindrical pots 40 are positionable on the lower burner portion 16 of the dual system coffee maker. Each of the pots 40 have a cover with an opening therethrough. The openings align with the openings in the lower end of the coffee filter attachment 34. Each of the pots 40 have a handle extending outwardly therefrom. The pots 40, when sitting on the lower burner portion 16, form a circular coffee pot.

In use, the present invention is a specially-designed coffee maker that will make two different types of coffee in two different pots 40. The pair of tubes 20 can be opened to allow water to flow to both pots 40 or to just one pot. The selector valve 22 will direct water to either of the two pots 40 or to both at the same time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A dual reservoir coffee machine for making two different types of coffee in two separate pots comprising, in combination:

a dual system coffee maker comprised of a housing, the housing having an upper water dispensing portion and a lower burner portion, the housing including a water holding reservoir therein, an opening in an upper end of the housing exposing the reservoir, the reservoir having a pair of tubes extending outwardly therefrom and extending upwardly into the water dispensing portion the tubes having open upper ends, the reservoir having a selector valve and a heater in communication with the pair of tubes;

a control panel disposed within the housing of the dual system coffee maker, the control panel being in communication with the selector valve and the heater of the dual system coffee maker, the control panel including a clock, a variable power switch and a timer;

a coffee filter attachment coupling with the water dispensing portion of the dual system coffee maker, the coffee filter attachment having a central divider panel separating the attachment into two sections, each of the sections being disposed below the open upper ends of the pair of tubes, each of the sections having an opening in a lower end thereof;

a pair of semi-cylindrical pots positionable on the lower burner portion of the dual system coffee maker, each of the pots having a cover with an opening therethrough, the openings aligning with the openings in the lower end of the coffee filter attachment, each of the pots having a handle extending outwardly therefrom.

2. A dual reservoir coffee machine for making two different types of coffee in two separate pots comprising, in combination:

a dual system coffee maker comprised of a housing, the housing having an upper water dispensing portion and a lower burner portion;

a control panel disposed in the housing of the dual system coffee maker;

a coffee filter attachment coupling with the water dispensing portion of the dual system coffee maker;

a pair of semi-cylindrical pots positionable on the lower burner portion of the dual system coffee maker, each of the pots having a cover with an opening therethrough, the openings aligning with the coffee filter attachment, each of the pots having a handle extending outwardly therefrom;

wherein the housing includes a water holding reservoir therein, an opening in an upper end of the housing exposing the reservoir, the reservoir having a pair of tubes extending outwardly therefrom and extending upwardly into the water dispensing portion, the tubes having open upper ends, the reservoir having a selector valve and a heater in communication with the pair of tubes.

3. The dual reservoir coffee machine as set forth in claim 2 wherein the control panel is in communication with a selector valve and a heater of the dual system coffee maker, the control panel including a clock, a variable power switch and a timer.

4. The dual reservoir coffee machine as set forth in claim 2 wherein the coffee filter attachment has a central divider panel separating the attachment into two sections, each of the sections being disposed below the water dispensing portion, each of the sections having an opening in a lower end thereof.

\* \* \* \* \*